(12) United States Patent
McDaniel et al.

(10) Patent No.: US 8,168,062 B2
(45) Date of Patent: May 1, 2012

(54) COMPOSITION AND METHOD FOR BREAKING WATER IN OIL EMULSIONS

(75) Inventors: Cato Russell McDaniel, The Woodlands, TX (US); Karl Kuklenz, The Woodlands, TX (US); Kurt Ginsel, The Woodlands, TX (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 12/760,149

(22) Filed: Apr. 14, 2010

(65) Prior Publication Data
US 2011/0253598 A1  Oct. 20, 2011

(51) Int. Cl.
*C10G 33/04* (2006.01)
(52) U.S. Cl. ........ 208/188; 208/296; 516/168; 516/191; 516/193
(58) Field of Classification Search .................. 208/188, 208/298; 516/191, 193
See application file for complete search history.

(56) References Cited

U.S. PATENT DOCUMENTS

| | | | |
|---|---|---|---|
| 1,617,739 A | 2/1927 | Averill | |
| 3,499,847 A * | 3/1970 | Fauke et al. | 528/393 |
| 3,740,421 A | 6/1973 | Schmolka | |
| 3,928,194 A | 12/1975 | Tao | |
| 4,209,422 A | 6/1980 | Zimmerman et al. | |
| 5,080,779 A | 1/1992 | Awbrey et al. | |
| 5,449,463 A | 9/1995 | Elliott et al. | |
| 5,773,590 A | 6/1998 | Hart | |
| 6,120,678 A | 9/2000 | Stephenson et al. | |
| 7,612,117 B2 | 11/2009 | McDaniel et al. | |

OTHER PUBLICATIONS

Xu, X. et al. (2006). Petroleum Science and Technology, 24, 673-688.*
Zaki, N.N. et al. (1996). Monatshefte fur Chemie, 127, 621-629.*

* cited by examiner

*Primary Examiner* — Walter D Griffin
*Assistant Examiner* — Brian McCaig
(74) *Attorney, Agent, or Firm* — Wegman, Hessler & Vanderburg

(57) ABSTRACT

A multi-component demulsifier comprising an alkoxylated $C_5$-$C_7$ alkyl substituted phenol-formaldehyde resin and at least one polyalkylene oxide triblock copolymer. This synergistic combination of materials is useful in breaking emulsions, of water in hydrocarbon or hydrocarbon in water.

10 Claims, No Drawings

COMPOSITION AND METHOD FOR BREAKING WATER IN OIL EMULSIONS

FIELD OF INVENTION

The invention pertains to methods for resolving or breaking various oil and water emulsions by the use of a combination of an alkyl phenol formaldehyde alkoxylated resin and one or more polyalkylene oxide triblock polyol surfactants. This combination may also be used in conjunction with other additional surfactants in resolving the emulsions.

BACKGROUND OF THE INVENTION

All crude oil contains impurities which contribute to corrosion, heat exchanger fouling, furnace coking, catalyst deactivation, and product degradation in refinery and other processes. These contaminants are broadly classified as salts, bottom sediment, and water (BS+W), solids, and metals. The amounts of these impurities vary, depending upon the particular crude. Generally, crude oil salt content ranges between about 3-200 pounds per 1,000 barrels (ptb).

Native water present in crude oils includes predominately sodium chloride with lesser amounts of magnesium chloride and calcium chloride being present. Upon thermal hydrolysis, chloride salts are the source of highly corrosive HCl, which is severely damaging to refinery tower trays and other equipment. Additionally, carbonate and sulfate salts may be present in the crude in sufficient quantities to promote crude preheat exchanger scaling.

Solids other than salts are equally harmful. For example, sand, clay, volcanic ash, drilling muds, rust, iron sulfide, metal, and scale may be present and can cause fouling, plugging, abrasion, erosion and residual product contamination. As a contributor to waste and pollution, sediment stabilizes emulsions in the form of oil-wetted solids and can carry significant quantities of oil into the waste recovery systems.

Metals in crude may be inorganic or organometallic compounds which consist of hydrocarbon combinations with arsenic, vanadium, nickel, copper, iron, and other metals. These materials promote fouling and can cause catalyst poisoning in subsequent refinery processes, such as catalytic cracking methods, and they may also contaminate finished products. The majority of the metals carry as bottoms in refinery processes. When the bottoms are fed, for example, to coker units, contamination of the end-product coke is most undesirable. For example, in the production of high grade electrodes from coke, iron contamination of the coke can lead to electrode degradation and failure in processes, such as those used in the chlor-alkali industry.

Desalting is, as the name implies, a process that is adapted (although not exclusively) to remove primarily inorganic salts from the crude prior to refining. The desalting step is provided by adding and mixing or emulsifying with the crude a few volume percentages of fresh water to contact the brine and salt. In crude oil desalting, a water in oil (W/O) emulsion is intentionally formed with the water admitted being on the order of about 3-10 volume % based on the crude oil. Water is added to the crude and mixed intimately to transfer impurities in the crude to the water phase. Separation of the phases occurs due to coalescence of the small water droplets into progressively larger droplets and eventual gravity separation of the oil and underlying water phase.

Demulsification agents are added, usually upstream from the separation vessel, and have a variety of purposes such as to help in providing maximum mixing of the oil and water phases, dehydrate the crude oil, provide faster water separation, better salt extraction or improved solids extraction and generate oil-free effluent water. Known demulsifying agents include water soluble organic salts, sulfonated glycerides, sulfonated oils, acetylated caster oils, ethoxylated phenol formaldehyde resins, polyols, polyalkylene oxides, ethoxylated amines, a variety of polyester materials, and many other commercially available compounds.

Desalters in refineries are also commonly provided with electrodes to impart an electrical field in the desalter. This serves to polarize the dispersed water molecules. The so-formed dipole molecules exert an attractive force between oppositely charged poles with the increased attractive force increasing the speed of water droplet coalescence by from ten to one hundred fold. The water droplets also move quickly in the electrical field, thus promoting random collisions that further enhance coalescence.

Upon separation of the phases from the W/O emulsions, the crude is commonly drawn off the top of the desalter and sent to the fractionator tower in crude units or other refinery processes. The water phase may be passed through heat exchanges or the like and ultimately is discharged as effluent.

In addition to the need for effective emulsion breakers in resolving the W/O emulsions in desalters and the like, W/O emulsions are also commonly employed in certain bitumen demulsification processes. The emulsions encountered can be of the oil in water type, wherein the density of the hydrocarbon materials is greater than that of water. In these cases, the hydrocarbon phase can be taken from the bottom of the vessel used for separation.

Emulsions are also formed during the production of crude oil. Water is associated with the geological formation and will be co-produced from the oil well. Also, water or steam may be added to the formation in enhanced oil recovery operations that will contribute water to the produced oil stream. Turbulence applied by choke points in the wellhead or production adds sufficient mechanical force to create an emulsion from the oil/water mixture. This water needs to be separated from the produced oil, as pipeline and other collection or transportation systems have specs on maximum amounts of water that can be associated with the oil. The water can lead to corrosion issues in the pipeline. Emulsion breakers are applied to speed the separation of the oil and water during production. Various types of equipment have been used to effect this separation such as dehydrators or heat treaters.

Emulsions that become difficult to break or resolve as a result of refinery reworks, tankwashes, interfaces and others are often referred to as "slop". This "slop" cannot be discharged directly due to environmental concerns so that it has therefore become important to efficiently resolve or separate the emulsion constituents into an oleaginous (oil) phase and a combined mud/non-oleaginous (i.e.) water phase. The oil phase may be used as a process fluid for refinery or other processes or recycled for down hole usage. The mud/water phase may be sent to further separation processes to separate the water for discharge or other use and the mud for possible recycling into down hole operations. Additionally, in some cases, the drilling mud actually seeps out of formation into the crude oil that is being extracted to form an undesirable drilling mud emulsion containing crude oil, water, and sometimes clay as components.

Accordingly, there is a need in the art to provide effective demulsifying treatments to resolve or break water and oil emulsions, particularly the crude oil emulsions encountered in desalter apparatuses, water and bitumen emulsions, and drilling mud emulsions. The emulsions may also be encountered in heat treaters, free water knockout apparatus, inclined

SUMMARY OF THE INVENTION

In one aspect of the invention, a method is provided for resolving an emulsion that includes an oil phase and an aqueous phase. The emulsion is contacted with an effective amount of an emulsifier composition comprising: 1) a $C_5$-$C_7$ alkyl phenol-formaldehyde resin alkoxylate and 2) a polyalkylene oxide triblock polyol surfactant wherein 1) is present in an amount of about 90-50% by weight based upon the combined weight of 1) and 2) the surfactant 2) is present in an amount of about 10-50% by weight based upon the combined weight of 1) and 2).

In another embodiment, the demulsifier composition comprises two or more polyalkylene oxide triblock polyol surfactants. One of the polyalkylene oxide triblock polyols has the formula a)

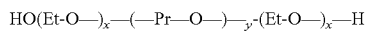

wherein Et is ethylene, Pr is propylene, x=5 and y=70; wherein $\overline{M}z$ is about 4,400 and the other of said polyalkylene oxide triblock polyols may have the formula b)

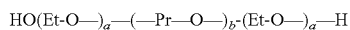

wherein Et is ethylene and Pr is propylene and a=20, b=40, and wherein $\overline{M}z$ is about 4,200.

In another aspect of the invention, the alkyl phenol-formaldehyde resin alkoxylate is amyl formaldehyde resin alkoxylate.

In another exemplary embodiment, a demulsifier composition comprises 1) a $C_5$-$C_7$ alkyl phenol-formaldehyde resin alkoxylate and 2) a polyalkylene oxide triblock polyol surfactant, said 1) and 2) being dispersed or dissolved in an organic solvent. The alkyl phenol formaldehyde resin alkoxylate 1) is present in an amount of about 90-50% by weight based upon the combined weight of 1) and 2) and wherein 2) is present in an amount of about 10-50 wt % based upon the combined weight of 1) and 2).

In another exemplary embodiment, the demulsifier composition comprises amyl phenol formaldehyde resin alkoxylate and a combination of a)

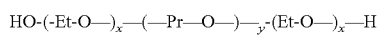

wherein Et is ethylene, Pr is propylene, each x=5 and y=70; wherein $\overline{M}z$ is about 4,400; and b)

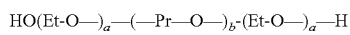

wherein Et is ethylene and Pr is propylene and each a=20, b=40, and wherein $\overline{M}z$ is about 4,200.

DETAILED DESCRIPTION OF EXEMPLARY EMBODIMENTS

Although the present invention is primarily described in conjunction with the resolution of a crude oil/water emulsion in a conventional desalter or the like or in an oilfied dehydration vessel, the artisan will appreciate that in a broader sense, the invention is applicable to resolution of a variety of oil and water emulsions. For example, emulsions encountered in the storage and processing of a variety of liquid hydrocarbon media including vacuum residia, solvent deasphated oils, gas oils, gasolines, diesel fuel, shale oil, liquefied coal, beneficiated tar sand, bitumen, etc., may all be treated in accordance with the invention.

In one exemplary aspect of the invention, a $C_5$-$C_7$ alkyl phenol-formaldehyde resin alkoxylate is utilized as one of the demulsifier components. These resins may, in one embodiment, have molecular weights on the order of about 1,000 to 5,000 $\overline{M}w$ and may include ethoxylates and/or propylates. These are commercially available and are prepared via the acid or base catalyzed condensation of the requisite alkylphenol and formaldehyde followed by base catalyzed reaction with for example 25-75% ethylene oxide. Synthetic routes for the production of these Novalak type resins may be gleaned from U.S. Pat. No. 4,209,422, incorporated by reference herein. In one embodiment, amylphenol formaldehyde resin ethoxylate is used as one component of the demulsifier composition.

The second component of the demulsifier composition is a polyalkylene oxide triblock polyol surfactant and in another exemplary embodiment at least two or more of such surfactants are utilized. In another exemplary embodiment, these surfactants are of the ethyleneoxide/propylene oxide block copolymer variety commonly referred to as "Poloamers". These are nonionic copolymers composed of a central hydrophobic chain of polypropylene oxide flanked by two hydrophilic chain moieties of polyethylene oxide. Such polymers are commercially available under the "Pluronic" trademark by BASF. Details pertaining to the preparation of these nonionic tri-block copolymers may be found in U.S. Pat. No. 3,740,421 (Schmolka et al.)—hereby incorporated by reference.

Block copolymers that may be used as the second component of the demulsifier composition preferably have molecular weights from about 500 to 30,000 with a molecular weight ($\overline{M}z$) of about 1,000-10,000 being more preferred. In another aspect of the invention, the combined EtO moieties comprise about 20-80% by weight based on 100 wt % total weight of the surfactant.

In one embodiment of the invention, a pair of the polyalkylene oxide triblock polyol surfactants is employed. In this case, the first polyol may have the formula a)

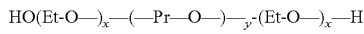

wherein Et is ethylene, Pr is propylene, each x=5 and y=70; wherein $\overline{M}z$ is about 4,400 and the other of said polyalkylene oxide triblock polymers may have the formula b)

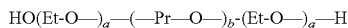

wherein Et is ethylene and Pr is propylene and each a=20, b=40, and wherein $\overline{M}z$ is about 4,200.

In one exemplary embodiment, the 1) $C_5$-$C_7$ alkyl phenol-formaldehyde resin alkoxylate is present in the demulsifier composition in an amount of about 90-50% (by weight) with the polyalkylene oxide triblock polyol surfactant 2) being present in an amount by weight of about 10-50 wt %, both based on the combined weight of 1) and 2).

In another aspect of the invention, the demulsifying components 1) and 2) are dispersed or dissolved in an organic solvent such as the aromatic solvents including benzene, toluene, cumene, xylene, and the like and the various napthas. In another embodiment, those napthas containing relatively high aromatic concentration such as the heavy aromatic napthas are used. Generally, these solutions or dispersions will contain from 10-80 wt % (actives) of the demulsifier composition components 1) and 2) as per above.

From about 1-500 ppm of each of 1) and 2) are added to make contact with the emulsion based on one million parts of the emulsion. In those situations in which the demulsifier treatment is used to resolve an emulsion in a desalter apparatus, the composition of 1) and 2) may be added to either the wash water flowing into the desalter, to the crude oil stream or directly to the emulsion so as to ensure thorough mixing of the components 1) and 2) with the emulsion.

In addition to the components 1) and 2), other surfactants 3) including ethoxylated amines, ethoxylated polyamines, alkylphenolethoxylates, aromatic sulfonates and sulfo succinates may be added in necessary amounts so that the total of 1), 2), and 3) present to contact the emulsion is from about 1 to about 1,500 ppm based on one million parts of the emulsion.

In summary, and in accordance with one exemplary embodiment, a multicomponent water in oil emulsion breaker is provided which includes a synergistic mixture of alkyl phenol formaldehyde resin ethoxylates (APE) and ethylene oxide propylene oxide triblock co-polymers such as the "Pluronic" brand surfactants. In an especially preferred embodiment, 70-80% of the active consists of an ethoxylated amyl novalak resin with an approximate degree of ethoxylation of 40%, and the remainder of the formulation consists of at least two of the Pluronics surfactants. These formulations have shown promise in light and medium asphatic crude oils.

Although applicants do not wish to be bound to any particular theory of operation, it is believed that the multicomponent mixture described above works together by at least three major mechanisms, namely: 1) Reduction of the dynamic interfacial tension, promoting Marangoni-Gibbs film drainage and droplet coalescence; 2) Wetting agent action helping to water wet inorganic solids and reduce the stabilization of Pickering emulsions; and 3) Action as a dispersant for organic solids such as asphaltenes—removing them from the interface. Additionally, the materials are thought to act as organic flocculants to promote settling and coalescence.

As is know in the art, desalting operations are required prior to refining operations. In one aspect of the invention, the demulsifier composition of the invention works in the desalter to speed the coalescence of water in oil emulsions and remove the water and salt from the oil in a rapid and complete manner.

In typical desalting units as described above, the interface between the crude oil hydrocarbons and the aqueous salt brines collects solid materials such as insoluble inorganic salts and insoluble organics in a so-called "rag" layer interfacial accumulation. If this interfacial accumulation or "rag" layer becomes too large, the efficacy of the desalters is diminished, and the ability to remove inorganic salts from the raw crude oil emulsions is adversely effected. In accordance with one aspect of this invention, the demulsifier composition serves to enhance the separation of water and salts from crude oil hydrocarbons, including asphaltenes, and decreases the rag layer which forms at the interface between the salt solution and the crude oil hydrocarbons.

Based upon preliminary data available at this time, two significant advantages of the invention appear. First, the demulsifier compositions and methods appear to be more effective than many previous formulations in light and medium oils. Secondly, the demulsifier compositions and methods do not contain any nonyl phenol, nonyl phenol ethoxylates, or nonyl phenol formaldehyde resin alkoxylates. These items are controlled or banned in many countries in Europe and in Canada.

EXAMPLES

In order to assess the emulsion breaking efficacy of the candidate materials, simulated desalter tests were undertaken. The simulated desalter comprises an oil bath reservoir provided with a plurality of test cell tubes dispersed therein. The temperature of the oil bath can be varied to about 300° F. to simulate actual field conditions. The test cells are placed into an electrical field to impart an electrical potential through the test emulsions.

Example 1

97 ml of crude oil along with 5 ml of D.I. water were admitted to each test cell along with the candidate emulsion breaker materials. The crude/water/treatment mixtures were homogenized by mixing each of the test cell tubes at 13,000 rpm for 2 seconds. The test cell tubes were heated to about 250° F. Water drop (i.e., water level) in ml was observed for each sample after the predetermined time intervals according to the schedule. Results are shown in Table 1. Demulsification efficacy is shown by increased water drop out amounts and speed of the water drop out.

TABLE 1

| Novolak resin (ppm) | Surfactant (ppm) | 2 min | 4 min | 8 min | 16 min | 32 min | Sum of Water Drops | Average of Sum of Water Drops | Water Drops of Treatment with Blank Subtracted | Synergism |
|---|---|---|---|---|---|---|---|---|---|---|
| Blank | Blank | 0.6 | 0.8 | 1.0 | 1.2 | 1.4 | 5.0 | 5.0 | | |
| N-1 (7 ppm) | S-1 (1.5 ppm) & S-2 (1.5 ppm) | 2.7 | 3.4 | 3.6 | 3.7 | 3.8 | 17.2 | 17.0 | 12.0 | 12.0 |
| N-1 (7 ppm) | S-1 (1.5 ppm) & S-2 (1.5 ppm) | 2.8 | 3.1 | 3.3 | 3.6 | 3.6 | 3.9 | 16.7 | | |
| N-1 (7 ppm) | Blank | 2.4 | 2.7 | 3.1 | 3.4 | 3.5 | 15.1 | 15.0 | 10.0 | |
| N-1 (7 ppm) | Blank | 2.1 | 2.96 | 3.2 | 3.3 | 3.4 | 14.9 | | | |
| Blank | S-1 (1.5 ppm) & S-2 (1.5 ppm) | 0.5 | 0.8 | 1.1 | 1.3 | 1.6 | 5.3 | 5.9 | 0.9 | 10.0 +0.9 —— 10.9 |

TABLE 1-continued

| Novolak resin (ppm) | Surfactant (ppm) | 2 min | 4 min | 8 min | 16 min | 32 min | Sum of Water Drops | Average of Sum of Water Drops | Water Drops of Treatment with Blank Subtracted | Synergism |
|---|---|---|---|---|---|---|---|---|---|---|
| Blank | S-1 (1.5 ppm) & S-2 (1.5 ppm) | 1.0 | 1.0 | 1.5 | 1.4 | 1.6 | 6.5 | | | |

N-1 = amyl phenol formaldehyde resin ethoxylate
S-1 = PPO/PEO triblock copolymer; molecular weight $\overline{Mz}$ 4400; 10% PEO
S-2 = PPO/PEO triblock copolymer, molecular weight $\overline{Mz}$ of 4200; 40% PEO The above examples indicate that the combination of N–1 with the addition of both of the PPO/PEO surfactants displays a synergistic effect as it produces 12.0 ml of water drops corrected from the blank. In contrast, N-1 by itself produces a 10.0 ml sum of the water drops corrected for the blank and the surfactants by themselves produced as 0.9 ml sum of the water drops as corrected for the blank. Thus, the sum of the individual components is 10.9 ml versus 12/0 ml for the combination of N–1 and the surfactants.

While this invention has been described with respect to particular embodiments thereof, it is apparent that numerous other forms and modifications will be obvious to those skilled in the art. The appended claim generally should be construed to cover all such obvious forms and modifications which are within the true spirit and scope of the present invention.

What is claimed is:

1. A method of resolving an emulsion that includes an oil phase and an aqueous phase comprising contacting said emulsion with an effective amount of a demulsifier composition comprising: 1) a $C_5$-$C_7$ alkyl phenol-formaldehyde resin alkoxylate and 2) one or more polyalkylene oxide triblock polyol surfactants, wherein 1) is present in an amount of about 90-50% by weight based upon the combined weight of 1) and 2), said surfactant 2) being present in an amount of about 10-50% by weight based upon the combined weight of 1) and 2).

2. A method as recited in claim 1 wherein said surfactant 2) comprises two or more polyalkylene oxide triblock polyol surfactants, one of said polyalkylene oxide triblock polyols having the formula a)

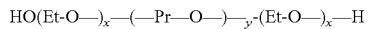

wherein Et is ethylene, Pr is propylene, each x=5 and y=70; wherein $\overline{Mz}$ is about 4,400 and the other of said polyalkylene oxide triblock polyols having the formula b)

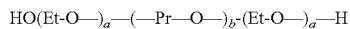

wherein Et is ethylene and Pr is propylene and each a=20, b=40, and wherein $\overline{Mz}$ is about 4,200.

3. A method as recited in claim 2 wherein said $C_5$-$C_7$ alkyl phenol-formaldehyde resin is amyl formaldehyde resin alkoxylate.

4. A method as recited in claim 3 wherein said emulsion is a water in oil (W/O) emulsion formed in a desalter wherein wash water is added to crude oil and mixed with said crude oil.

5. A method as recited in claim 1 further comprising feeding about 1-500 ppm of 1) to said emulsion based on 1 million parts of said emulsion, and feeding from about 1-500 ppm of 2) to said emulsion based on 1 million parts of said emulsion.

6. Method as recited in claim 1 wherein said emulsion is a bitumen emulsion.

7. Method as recited in claim 1 wherein said emulsion is formed in a device selected form the group of heat-treater apparatus, free water knockout apparatus, inclined plate separation apparatus and a gun barrel water separation apparatus.

8. Demulsifier composition comprising: 1) a $C_5$-$C_7$ alkyl phenol-formaldehyde resin alkoxylate and 2) a polyalkylene oxide triblock polyol surfactant, said 1) and 2) being dispersed or dissolved in an organic solvent, said 1) being present in an amount of about 90-50% by weight based upon the combined weight of 1) and 2) and said 2) being present in an amount of about 10-50 wt % based upon the combined weight of 1) and 2).

9. Demulsifier composition as recited in claim 8 wherein said 1) is amyl phenol-formaldehyde resin alkoxylate and 2) is a combination of a) a polyalkylene oxide triblock polyol having the formula a)

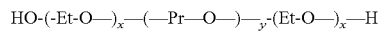

wherein Et is ethylene, Pr is propylene, each x=5 and y=70; wherein $\overline{Mz}$ is about 4,400; and b)

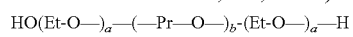

wherein Et is ethylene and Pr is propylene and each a=20, b=40, and wherein $\overline{Mz}$ is about 4,200.

10. Demulsifier composition as recited in claim 9 wherein said organic solvent comprises heavy aromatic naptha.

* * * * *